Figures 2, 3:
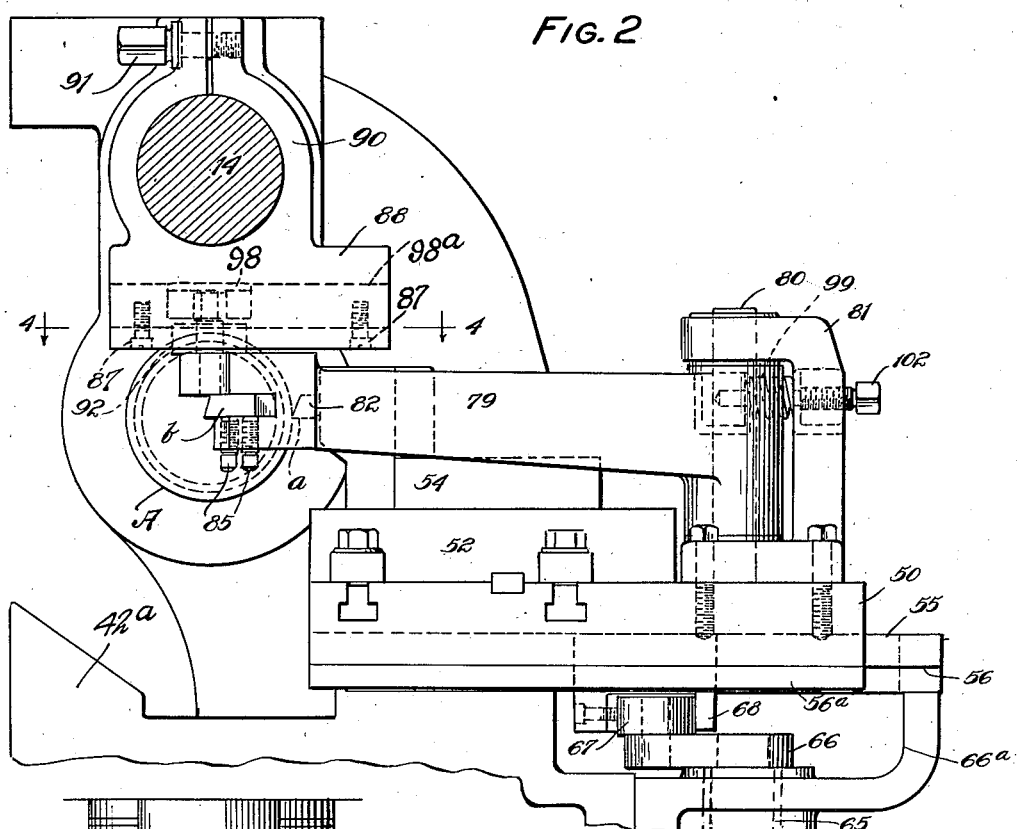

March 27, 1928.
G. D. SUNDSTRAND
LATHE
Filed July 7, 1923
1,663,671
3 Sheets-Sheet 1
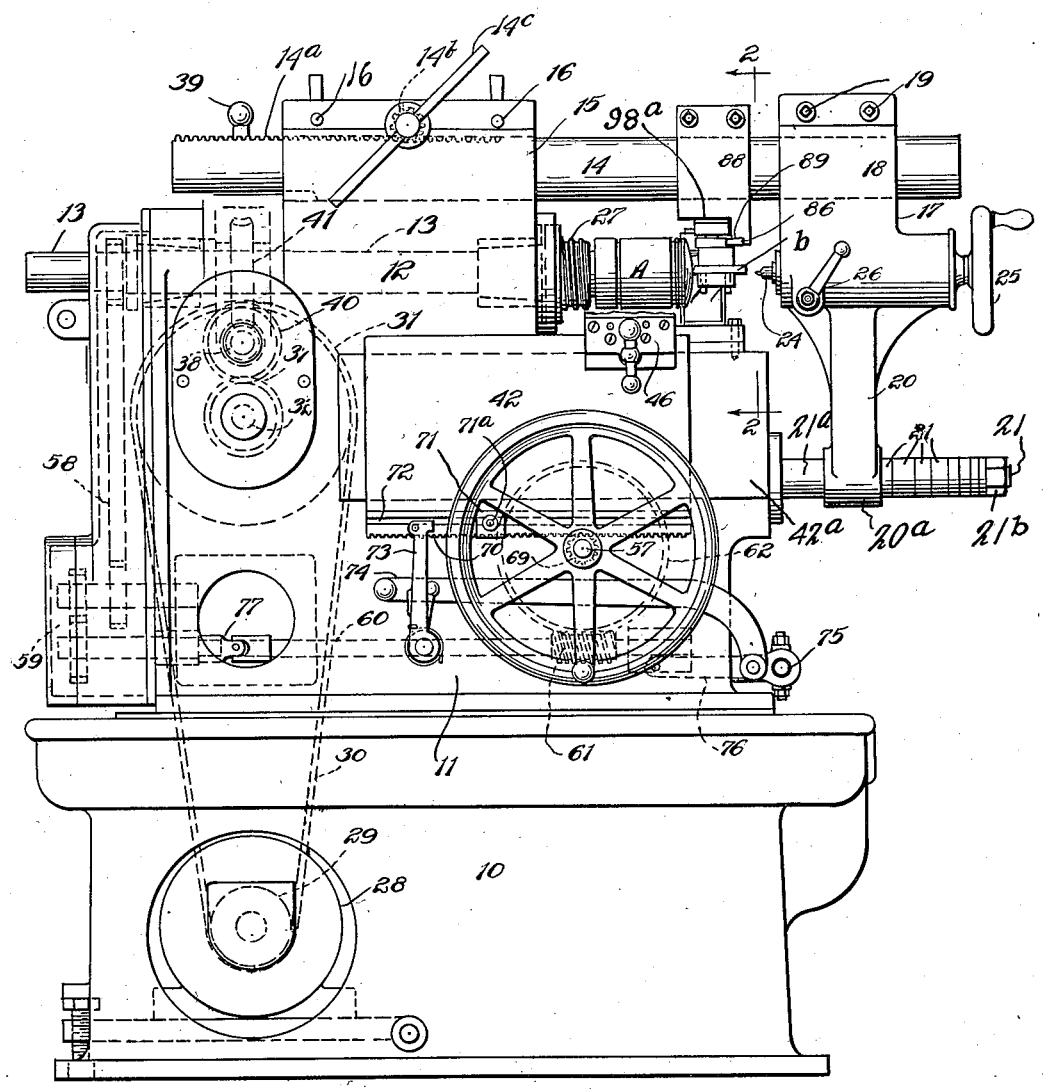
FIG. 1
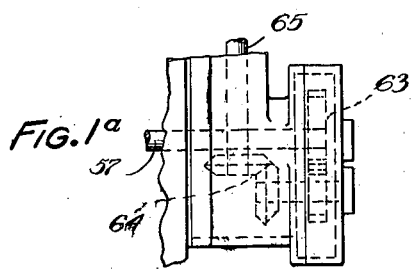
FIG. 1ª
Inventor
G. D. Sundstrand March 27, 1928.  G. D. SUNDSTRAND  1,663,671

LATHE

Filed July 7, 1923   3 Sheets-Sheet 2

Inventor
G. D. Sundstrand
By Thindahl, Parker & Carlson
Attys

March 27, 1928.
G. D. SUNDSTRAND
1,663,671
LATHE
Filed July 7, 1923
3 Sheets-Sheet 3
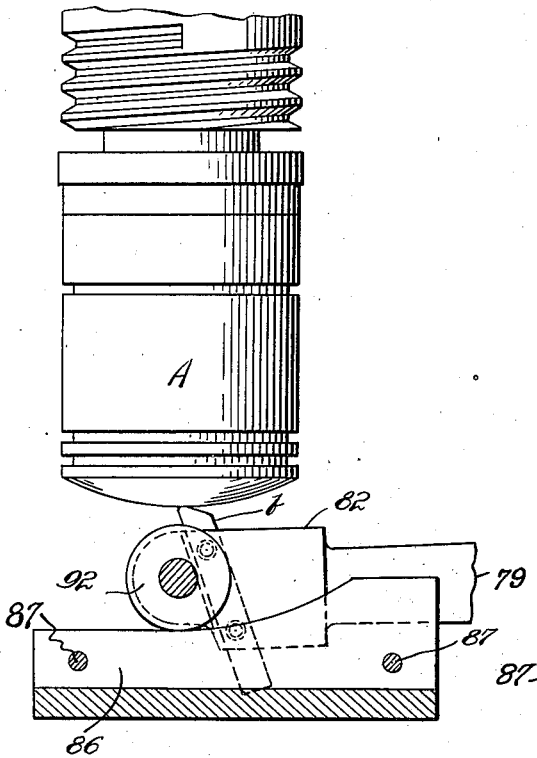
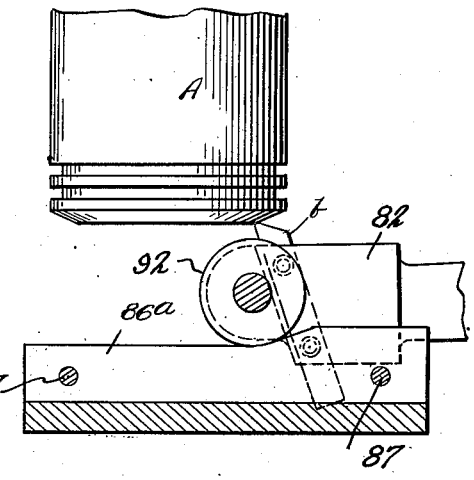
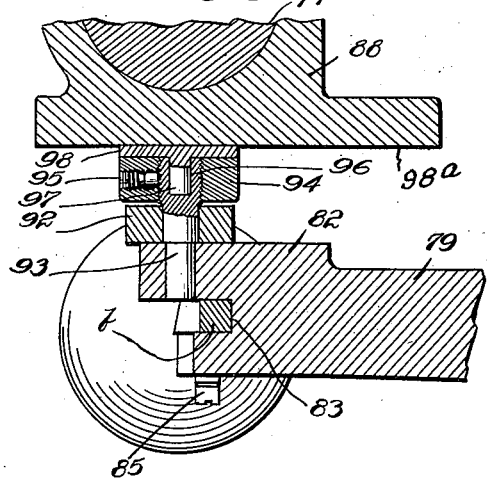
Inventor
G. D. Sundstrand
By Chindahl, Parker & Carlson
Attys Patented Mar. 27, 1928.

1,663,671

UNITED STATES PATENT OFFICE.

GUSTAF DAVID SUNDSTRAND, OF ROCKFORD, ILLINOIS, ASSIGNOR TO SUNDSTRAND MACHINE TOOL CO., OF ROCKFORD, ILLINOIS, A CORPORATION OF ILLINOIS.

LATHE.

Application filed July 7, 1923. Serial No. 650,174.

The invention relates to the manufacture of parts requiring a substantial amount of machine work such, for example as pistons, universal joint crosses, bushings and rings of various types, and similar small parts, and has particular reference to a lathe adapted to perform a number of separate operations simultaneously or substantially so.

The present invention is especially directed to the provision, in a lathe of the character indicated, of a tool carrier which is adapted to move a cutting tool into engagement with the work in such a manner as to produce a special configuration not possible of attainment by a tool travelling in a rectilinear path.

A further object of the invention is to provide in a lathe a rigid support for a guide member in the nature of a template with which a tool carrier moving relative to the work may coact to effect the desired configuration.

Still another object of the invention is to provide a special tool carrier of the type indicated which is operatively associated with a main tool carriage for movement therewith.

In the accompanying drawings I have shown by way of illustration a preferred embodiment of the invention, but it will be understood that it is contemplated that other and equivalent means may be devised by those skilled in the art without departing from the spirit and scope of the invention as expressed in the appended claims.

Figure 1 of the drawings is a front elevational view of a lathe embodying my invention. Fig. 1ª is a fragmentary detail view showing a part of the drive mechanism. Fig. 2 is a fragmentary vertical sectional view taken substantially in the plane of line 2—2 of Fig. 1. Fig. 3 is a fragmentary plan view of the parts shown in Fig. 2. Fig. 4 is a fragmentary horizontal sectional view taken substantially in the plane of line 4—4 of Fig. 2 and illustrating the coaction of the tool carrier and template. Fig. 5 is a similar view but illustrating a slightly different form of template. Fig. 6 is a fragmentary vertical sectional view illustrating the construction of the forward end of the tool carrier.

I have herein shown and will describe my invention as applied to the machining of internal combustion engine pistons, the special tool carrier being especially adapted to face the closed end of the piston.

As herein shown, the lathe comprises a hollow base 10 upon which is supported a body 11 of substantial height at one end forming in effect a column and lower at its other end to form a bed. The upper portion of the column forms a stationary headstock 12 in which a work-supporting spindle 13 is journalled, and above the spindle is mounted a shaft 14 which extends longitudinally over the bed. This shaft is made of substantial size, forming a rigid overarm, and is securely clamped in the extreme upper end of the column by means of a split bearing 15 formed integral with the headstock and having clamping bolts 16.

At the opposite end of the bed I provide a tailstock 17 which is so mounted as to constitute a connection between the overarm and the lathe bed. Thus the tailstock has in its upper portion a split bearing 18 equipped with clamping bolts 19 whereby the tailstock may be rigidly clamped upon the overstock arm. Also the tailstock has a depending portion 20 having a hub 20ª which is adjustably mounted upon a stud 21 projecting outwardly from the bed. The stud 21 is of sufficient length to allow for any necessary adjustment of the tailstock. 21ª are spacer sleeves or collars which may be placed on the stud 21 at either or both sides of the hub 20ª. 21ᵇ is a nut on the outer end of the stud 21 for clamping said hub and the series of spacer sleeves against the end of the bed. This construction while providing an effectual support for the tailstock also provides a support for the free end of the overarm. The tailstock may be provided with a center 24 adjustable in the usual way by means of a hand wheel 25 and arranged to be locked by the clamping screw 26.

The spindle 13 may be provided with suitable means for holding the work A, herein shown as a piston. I have shown in the present instance for this purpose a chuck 27 of a well known character.

Preferably the overarm 14 is adjustable longitudinally in the headstock through the medium of a rack 14ª and pinion 14ᵇ, the latter being operative by a cross bar 14ᶜ.

Enclosed within the base 10 is an electric motor 28 which I prefer to employ as the source of power. This motor is connected with the spindle 13 by means of a pulley 29, a belt 30, a pulley 31 mounted upon a shaft 32, and a pair of intermeshing gears 37. One of these gears is fastened upon the shaft 32 and the other is mounted upon a parallel shaft 38 which also carries a worm 40 meshing with a worm wheel 41 fast upon the spindle 13. A suitable shifting clutch (not herein shown) having an operating handle 39 (Fig. 1) may be interposed between the pulley 31 and its driving connection with the spindle.

Movable longitudinally of the lathe bed, in a direction parallel to the spindle, is a front tool carriage 42 mounted upon suitable ways 42ª and having a saddle 46 mounted thereon for transverse movement. The saddle in turn may support a tool holder (not herein shown) adapted to carry tools which in the longitudinal movement of the carriage serve to turn the outer periphery of the work A.

Also mounted upon the lathe bed is a rear tool carriage 50 (Fig. 2) carrying a table 52 adjustable longitudinally of the bed and in turn supporting a tool holder 54 adjustable transversely of the bed. As shown in Fig. 2, the rear tool carriage 50 is mounted upon a plate 55 providing undercut ways 56 adapted to be engaged by gib-plates 56ª upon the carriage.

The mechanism for moving the carriages 42 and 50 is actuated from a common drive means including a shaft 57 mounted transversely in the body 11 and operatively connected with the spindle 13 by means of a chain and sprocket connection 58 (Fig. 1), change speed gears 59, a shaft 60, a worm 61 and a worm wheel 62, the latter being fast upon the forward end of the shaft 57.

The means for moving the carriage 50 is actuated from the shaft 57 and comprises a pair of spur gears 63 (Fig. 1ª), one of which is fast on the shaft 57, bevel gears 64, and a vertical shaft 65 (Fig. 2). On the upper end of the latter is fast a crank arm 66 carrying a roller 67 which engages with the carriage 50 through the medium of a depending portion 68 operating in a suitable aperture provided in the plate 56. The depending portion 68 is constructed to provide a groove extending longitudinally of the bed or parallel with the work spindle. Beneath the plate 56 the body 11 is shaped to coact with a gear housing for the shaft 65 and associated parts, the upper end of said housing being shaped to provide a closed chamber 66ª in which the crank arm 66 and its associated parts may operate.

Preferably the crank arm 66 is so arranged that in the initial forward movement of the rear tool carriage 50, the rate of travel is relatively rapid as compared to the final movement when the crank arm approaches its foremost position (Fig. 2). I take advantage of this variation in the rate of movement of the carriage by mounting in said tool holder a set of turning tools a adapted to perform operations requiring the slower rate of feeding movement, namely, the cutting of the grooves in the periphery of the piston, while the operation of facing the closed end of the piston, as hereinafter set forth, is performed during the rapid movement of the carriage.

The front carriage 42 is also actuated from the shaft 57 through the medium of a pinion 69 and rack 70 (Fig. 1), the former being fast upon the shaft 57 and the latter rigid with the lower edge of the carriage. A block 71 is mounted for longitudinal adjustment at the lower edge of the carriage 42 in a groove 72 and has a forwardly projecting pin 71ª arranged to engage with a means for stopping the feeding operation at a predetermined point in the travel of the carriage. This means comprises a latch member 73 normally supporting the free end of a lever 74 pivoted at 75 and having rigid therewith an arm 76 which pivotally supports a bearing for the free end of the shaft 60 upon which the worm 61 is mounted. In said shaft is interposed a universal coupling 77 which, when the latch member 73 is engaged by the pin 71ª to release the lever 74, permits the worm 61 to disengage from the worm wheel 62.

It will be apparent that since the rear tool carriage is driven from the shaft 57 as is also the front tool carriage, when this tripping operation takes place, the entire feeding mechanism is brought to a stop. To restore the parts to their initial position the shaft 57 may be actuated through the medium of a hand wheel 78.

The special or auxiliary tool carrier which I have provided in the present instance for facing the closed end or crown of the piston, is operatively associated with the rear tool carriage 50 for movement therewith. This carrier comprises mainly a member in the form of a bell-crank lever having an arm 79 (Figs. 2 and 3) the rear end of which is mounted upon a pivot pin 80 carried by a U-shaped bracket 81. The latter is bolted upon the rear end of the carriage 50 at one side thereof. The other or forward end of the arm 79 is constructed to provide a head 82 (Fig. 6) which is slotted as at 83 to receive a cutting tool b adapted to be secured in position by a pair of screws 85.

86 designates a guide plate or template secured as by means of screws 87 (Fig. 2) to the underside of a support 88 mounted upon the overarm 14. The underside of said support is provided with a rabbet 89 to receive the template as shown in Figs. 1 and 2; and the support has at its upper end a split head 90 for receiving the overarm 14. This head is provided with a pair of clamping screws 91 whereby the support may be made fast upon the overarm.

Upon the extreme forward end of the arm 79 I provide a roller 92 adapted to engage with the template 86. This roller is carried by a stud 93 mounted in a forwardly projecting portion of the head 82 and screw-threaded at its upper end to receive a nut 94 having a set screw 95. The extreme upper end of the stud 93 is provided with a socket 96 into which depends a stem 97 of a disk 98; and as shown clearly in Fig. 6, the support 88 is constructed so as to provide an enlarged bearing surface 98ᵃ upon its underside against which the disk 98 may slide in the transverse reciprocation of the tool carrier.

It will be apparent that by this construction, not only is the overarm utilized as a means for holding the tool to the work, but other cutting strains due to the rotation of the work are transmitted directly through the support 88 to the overarm. The enlarged lower end of the support, moreover, serves as a guard to protect the roller and template from dust and dirt.

The means which I provide for causing the roller 92 on the free end of the carrier to follow the outline of the template 86 comprises a coiled expansion spring 99 (Fig. 3) interposed between the bracket 81 on the one hand and the carrier on the other hand. To this end the bracket is provided with a laterally extending portion 100 carrying at its free end a stud 101 adjustable by means of a screw 102 to vary the tension of the spring; and the other arm 103 of the bell crank forming the carrier is arranged in opposed relation to the arm 100. The arm 103 carries at its free end a stud 104 which coacts with the stud 101 to retain the spring 99 in position.

In Fig. 5 of the drawings I have shown the template 86ᵃ in a form somewhat different from the template 86 shown in Fig. 4 to conform with a different configuration to be imparted to the piston crown.

It will be observed that by providing the overarm 14 I have made it possible to move a cutting tool in a non-rectilinear path while holding it in cutting engagement with the work with as much rigidity as though the tool were supported upon the lathe bed in the usual way. Furthermore, to take an additional cut the template and its support may be readily moved into parallel positions toward the work by releasing the clamping bolts 16 and 19 and then adjusting the overarm 14. At the same time I have gained the advantage of simplicity in construction, rendering it unnecessary to provide ways upon the bed to support such a tool and rendering it possible to utilize the lathe bed in supporting other cutting tools without interference by the auxiliary tool. The construction which I employ is advantageous, moreover, because the strains in the cutting operation, both such as are in a direction away from the work as well as those incident to the rotation thereof, are borne almost entirely by the overarm; the rear tool carriage being utilized essentially as a means for feeding the tool to the work. A further advantage due to the association of the auxiliary carrier with the rear tool carriage results from the use of the crank feed for this carriage, which operates to move the carriage initially at a relatively high speed and finally as the crank approaches its extreme forward position, at a relatively slow speed. Thus, the arrangement may be such that while travelling at a high speed the less difficult operation of facing the end of the work may be performed, and while the carriage is moving at a slow speed the work of producing heavier cuts, such as forming grooves in the periphery of the work, or similar operations, may be performed.

The general construction of the lathe herein illustrated is claimed in my application Serial No. 591,038, filed September 27, 1922.

I claim as my invention:

1. A lathe having a carriage, a bracket on the carriage, a bell crank lever pivotally mounted on the carriage and having one arm extending in opposed relation to the bracket, and another arm adapted to support a tool at its free end, means providing a template with which the free end of said tool-carrying arm is adapted to coact, and spring means interposed between said bracket and the first mentioned arm.

2. A lathe having a reciprocatory carriage, means for rotatably supporting the work, a tool carrier comprising a bell crank lever pivotally mounted on said carriage, one arm of said bell crank being adapted to support a tool for movement into engagement with the work, means coacting with said arm to guide the tool in the reciprocation of the carriage, and means acting upon the other arm of said bell crank to hold the carrier in operative association with said guiding means.

3. A lathe having an overarm, means for rotatably supporting the work below and on an axis parallel with the overarm, a carriage mounted for reciprocation transversely of the work axis, a tool carrier on said carriage and including a member mounted to swing on a vertical axis and adapted to carry a cutting tool, a roller on said pivoted member, a support carried by the overarm and having a portion depending to a point adjacent said roller, and a template located between the support and said roller and secured to the support.

4. A lathe having an overarm, means for rotatably supporting the work below and on an axis parallel with the overarm, a carriage mounted for reciprocation transversely of the work axis, a tool carrier on said carriage including a member mounted to swing on a vertical axis and adapted to carry a cutting tool, a roller on said pivoted member, a support carried by the overarm and having a portion depending to a point adjacent said roller, a template located between the support and said roller and secured to the support, said support also having a flat bearing surface disposed in a plane above the template, and a bearing member carried by the pivoted member adapted slidably to engage said bearing surface.

5. In a lathe, the combination of a carriage, means for moving the carriage including a crank adapted to impart first a relatively high speed to the carriage and finally a relatively slow speed, a tool holder rigidly mounted on the carriage, and an auxiliary tool carrier mounted on the carriage to swing on a vertical axis, the tools carried by the first and second mentioned holders being arranged to operate respectively while the carriage is moving at a relatively high and low speed.

6. A lathe having, in combination, a bed, means for rotatably supporting the work, as, for example, a piston, a front carriage on the bed, a rear tool carriage on the bed, a tool carrier pivotally mounted on the rear tool carriage, a tool on the forward end of said carrier for facing the closed end of the piston, an overarm, a templet secured to the overarm adjacent to the closed end of the piston, a part on said overarm having a horizontal bearing surface on its lower side adjacent to the closed end of the piston, a roller on the forward portion of the tool carrier, a spring acting on said tool carrier to hold said roller in engagement with the templet, said roller being between the facing tool and the templet, whereby the pressure of the work against the tool is resisted by the templet, and a part on the forward end of said tool carrier arranged to slide in engagement with said horizontal bearing surface to resist the upward pressure of the work.

7. A lathe having, in combination, a bed, means for rotatably supporting the work, a front carriage on the bed, a rear tool carriage on the bed, a tool carrier pivotally mounted on the rear tool carriage, a tool on the forward end of said carrier, an overarm, a templet secured to the overarm adjacent to the work, a part on said overarm having a horizontal bearing surface on its lower side adjacent to the work, a roller on the forward end of the tool carrier, a spring acting on said tool carrier to hold said roller in engagement with the templet, and a part on the forward end of said tool carrier arranged to slide in engagement with said horizontal bearing surface to resist upward pressure of the work.

8. A lathe having, in combination, a bed, means for rotatably supporting the work, a front carriage on the bed, a rear tool carriage on the bed, a tool carrier movably mounted on the rear tool carriage, a templet supported adjacent to the work, a part having a horizontal bearing surface on its lower side adjacent to the work, a roller on the forward portion of the tool carrier, a spring acting on said tool carrier to hold said roller in engagement with the templet, and a part on the forward end of said tool carrier arranged to slide in engagement with said horizontal bearing surface to resist the upward pressure of the work.

9. A lathe having, in combination, a bed, means for rotatably supporting the work, a front carriage on the bed, a rear tool carriage on the bed, a tool carrier pivotally mounted on the rear tool carriage, a templet supported adjacent to the work, a part having a horizontal bearing surface on its lower side adjacent to the work, means on the forward portion of the tool carrier to engage the templet, and a part on the forward end of said tool carrier arranged to slide in engagement with said horizontal bearing surface to resist the upward pressure of the work.

10. A lathe having, in combination, a bed, means for rotatably supporting the work, a tool carriage movable transversely of the bed, a tool carrier pivotally mounted on the carriage, a templet mounted adjacent to the work for adjustment axially of the work and having a guide face parallel to the surface of the work when finished, a part supported on said bed independently of said carriage having a horizontal bearing surface adjacent to and above the work, means on the tool-carrying end of the tool carrier to engage the templet, and a part on the tool-carrying end of said tool carrier arranged to slide in engagement with said horizontal bearing surface to resist the pressure of the work.

11. A lathe having, in combination, a bed, means for rotatably supporting the work, a carriage movable transversely of the bed, a tool carrier movably mounted on said carriage, a tool on said carrier, an overarm, a part secured on said overarm adjacent to the work, a templet secured to said part adjacent to the work, said part having a horizontal bearing surface adjacent to the work, means on one end of said tool carrier to engage the templet, and a part on the tool carrier arranged to slide in engagement with said horizontal bearing surface to resist pressure of the work.

12. A lathe having, in combination, a bed, means for rotatably supporting the work, a tool carriage movable transversely of the bed, a tool carrier movably mounted on the carriage, means to guide the tool-carrying end of said tool carrier having a contour parallel to the surface of the work when finished and mounted for adjustment towards and from the work, means to engage the tool-carrying end of said tool carrier to resist the pressure of the work, said guide means and said engaging means being supported on the bed independently of the tool carriage and above the tool carrying end of the tool carrier.

In testimony whereof, I have hereunto affixed my signature.

GUSTAF DAVID SUNDSTRAND.